US007533277B2

(12) United States Patent  (10) Patent No.: US 7,533,277 B2
Bernstein et al. (45) Date of Patent: May 12, 2009

(54) OPERATING SYSTEM SHUT DOWN

(75) Inventors: Michael Bernstein, Bothell, WA (US); Huat Chye Lim, Seattle, WA (US); HyunSuk Kim, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 11/278,640

(22) Filed: Apr. 4, 2006

(65) Prior Publication Data

US 2007/0234086 A1   Oct. 4, 2007

(51) Int. Cl.
*G06F 1/26* (2006.01)
(52) U.S. Cl. ..................... 713/300; 713/330
(58) Field of Classification Search .............. 713/1, 713/2, 100, 300, 310, 330
See application file for complete search history.

(56) References Cited

U.S. PATENT DOCUMENTS

| 5,758,155 | A | 5/1998 | Circenis |
| 5,794,031 | A | 8/1998 | Nakadai |
| 6,412,074 | B1* | 6/2002 | Flannery ..................... 713/310 |
| 6,686,934 | B1 | 2/2004 | Evans |
| 6,957,363 | B2 | 10/2005 | Spiegel |
| 2002/0113777 | A1 | 8/2002 | Lauderdale |
| 2003/0084276 | A1 | 5/2003 | Levidow et al. |
| 2004/0040024 | A1 | 2/2004 | Green et al. |
| 2004/0073817 | A1* | 4/2004 | Liu et al. ..................... 713/300 |
| 2004/0076177 | A1 | 4/2004 | Koch |
| 2005/0278700 | A1 | 12/2005 | Buskens et al. |
| 2006/0053417 | A1* | 3/2006 | Henderson et al. .......... 717/168 |

OTHER PUBLICATIONS

Shutdown Event Tracker Internet printout: http://www.microsoft.com/technet prodtechnol/winxppro/plan/rlbwinxp.mspx.
Shutdown manager and tools 1.0.0.73 Description Internet printout: http://www.softsland.com/Shutdown_Manager_and_Tools.html.
Windows NT/2000 Startup & Shutdown Internet printout: http://www.smartcomputing.com/editorial/article.asp?article= articles/archive/10706/10106/10106.asp.
"Expected" and "unexpected" startups and shutdowns Internet printout: http://technet2.microsoft.com/WindowServer/en/Library/37a74768-4917-4736-a021-94a39be536a81033.mspx.
How to Make Windows XP Shut Down. Faster Internet printout: http://www.thetechzone.com/?m=show&id=489.

* cited by examiner

*Primary Examiner*—Dennis M Butler
(74) *Attorney, Agent, or Firm*—Wolf, Greenfield & Sacks, P.C.

(57) ABSTRACT

A user interface and scheme is provided for facilitating shutting down an operating system. A shut down command is initiated in an operating system, and applications running on the system are issued a shut down request. Aspects allow running applications to delay the system shut down and to register information to explain the delay, for example, a non-interruptible task (e.g., a CD burn) is being performed by the application. A user interface displays applications running on the system and delay information registered by the applications, providing the user an opportunity to terminate the applications or cancel the system shut down based on the applications and any delay information provided.

20 Claims, 5 Drawing Sheets

OPERATING SYSTEM SHUT DOWN

BACKGROUND

When a user attempts to shut down an operating system, such as the Windows XP brand operating system by Microsoft Corporation of Redmond, Wash. or the Mac OS X operating system by Apple Computer, Inc. of Cupertino, Calif., certain applications possess the ability to cancel or indefinitely block shut down. When shut down is temporarily blocked by other applications, the user experience can be unpleasant as the user may not be provided with any system generated indication of what is going on and shut down is obviously delayed.

As an example, in the Windows XP brand operating system, when a user has an unsaved document in an application such as Microsoft Word and attempts to shut down his computer, Word will display a dialog box prompting the user as to whether he desires to save the document. Assuming that Word is hung or not responding, Windows then occludes the first dialog box with a second dialog box asking the user whether he would like to end the application now (immediately) and lose any unsaved data. If the user chooses to end the application now the application closes and another running application, if one exists, will generate a similar pair of dialogs until all applications have been terminated. If the user chooses not to end the application now, the application continues closing on its own. Once completed, if the user has other running applications, the process repeats itself for each application until all the applications close. Then the system finally shuts down. From the aforementioned description, shutting down the operating system can be frustrating, tedious and most certainly longer than desired. Additionally, the applications that block the operating system shut down often do not explain to the user what task the application is currently performing or why the application is blocking shut down.

SUMMARY

This summary is provided to introduce a selection of concepts in a simplified form that are further described below in the Detailed Description. This summary is not intended to identify key or essential features of the claimed subject matter, nor is it intended to be used in any way to limit the scope of the claimed subject matter.

Aspects relate to providing a scheme and graphical user interface for shutting down an operating system. Some aspects include a computer readable medium storing computer-executable instructions for performing a method for shutting down an operating system. In certain aspects, the method includes receiving a command to initiate operating system shut down, and determining an application that is delaying the shut down. The application may provide delay information, for example, a message describing a non-interruptible task currently being performed (e.g., burning a CD). After a system shut down has been initiated, a list of running applications may be displayed, along with delay information provided by the applications for delaying the system shut down, thus allowing the user to make an informed choice whether to continue with the operating system shut down.

Certain other aspects relate to setting delay information associated with an application. An application may set a delay reason by communicating with the operating system prior to performing a task that should not be interrupted by a system shut down. After the completion of the task, the application may then remove the delay information previously set, thus configuring the operating system not to delay any subsequent system shut down based on this task.

In other aspects, a graphical user interface is generated for assisting the user in shutting down the operating system. The graphical user interface according to some aspects includes an application region identifying at least one instance of an application that delays shut down, along with delay information informing the user why the application is delaying shut down. Other aspects include a shut down object, which responsive to selection causes the operating system to terminate some or all running applications, and a cancel object, which responsive to selection causes the operating system to cancel shut down.

BRIEF DESCRIPTION OF THE DRAWINGS

The foregoing summary, as well as the following detailed description, is better understood when read in conjunction with the accompanying drawings, which are included by way of example, and not by way of limitation and in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Illustrative Operating Environment

Figure 1:
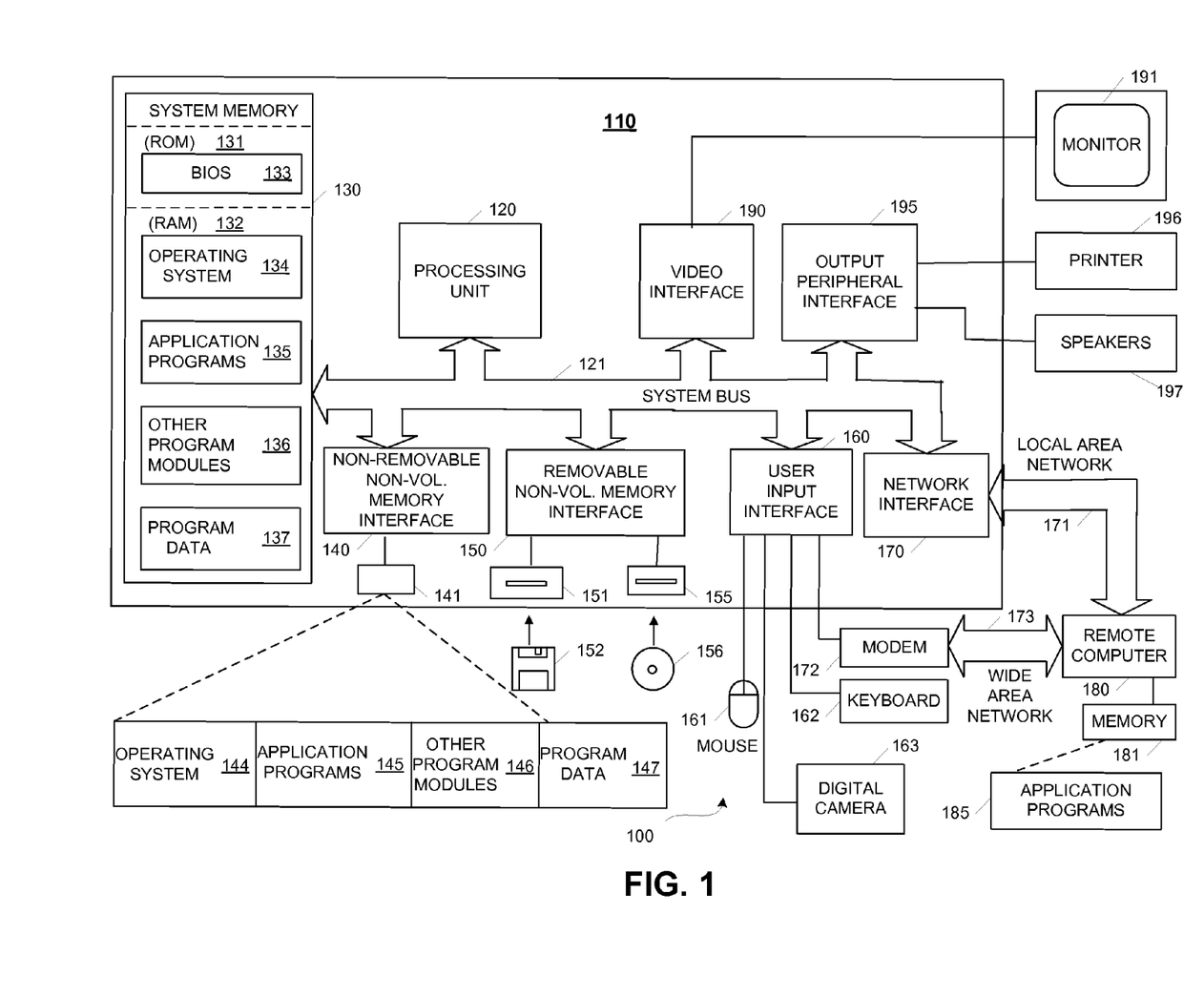
FIG. 1 illustrates a schematic diagram of a general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Illustrative Aspects

The following aspects will focus on a Windows based operating system. It will be understood, however, that aspects of the invention will apply similarly to other operating systems including, but not limited to, Mac and Linux based operating systems.

Figure 2:
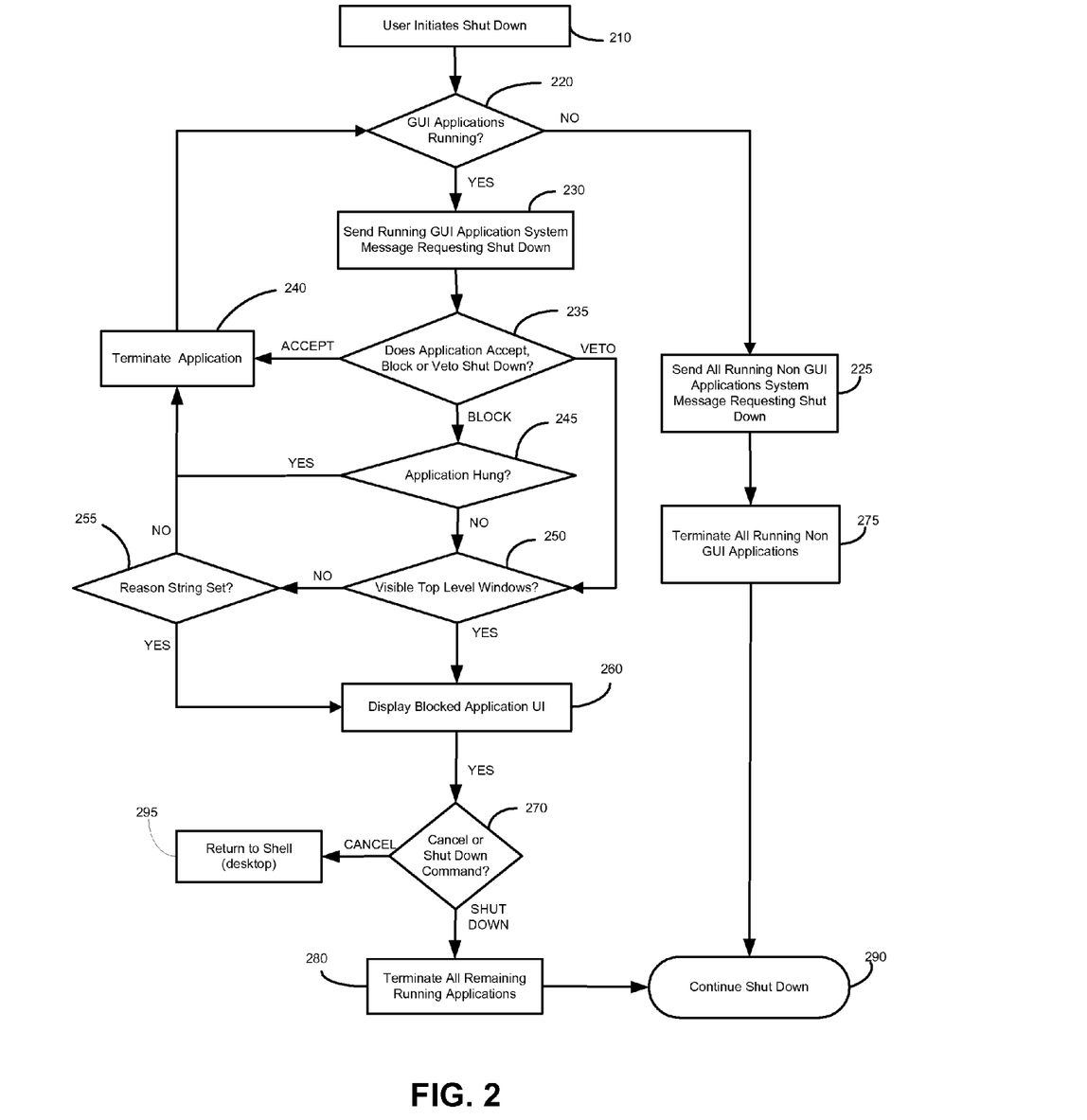
FIG. 2 is a flow chart showing an illustrative implementation according to aspects of the present invention.

FIG. 2 describes an illustrative process for shutting down an operating system. According to this example, in step 210 a user initiates shut down of the operating system 134 in one of the available ways, such as activating a shut down command by clicking on a navigation menu displayed on monitor 191 via an input such as mouse 161. In response to the initiation of shut down, in step 220 the operating system 134 determines whether, of application programs 135, any GUI (graphical user interface) applications are running.

There are two types of GUI applications, those that can have a top level window and those that cannot. In a computer running the Windows XP brand operating system an application that has a top level window is an application that is capable of being represented by a button in the task bar, and an application that does not have a top level window is an application that is not typically represented by a button in the task bar. In the Windows XP brand operating system, an application can set a visibility flag, and if the flag is set to false, the window is considered "hidden;" a hidden window can never be displayed on the desktop and thus cannot have a visible top level window. Specific examples of applications in the Windows XP brand operating system that do not have a top level window include Windows services applications such as the Windows Search Service. Applications which do not have top level windows may be thought of as transparent to the user in that they are running in the background unnoticed. A non GUI application is a command line or console application, which cannot make use of the operating system APIs that allow applications to provide the UI features commonly associated with the operating system such as buttons, scroll bars, multiple windows, formatted text, etc., found in Windows XP brand operating system. Also, the non-GUI application cannot be represented in the task bar in a Windows XP brand operating system.

If no GUI applications are running (step 220: no), for example if the user has closed all the open applications 135 prior to initiating shut down, the operating system proceeds to automatically terminate the remaining running non GUI applications. In step 225 a system message requesting shut down is sent to all running non-GUI applications, if any. If there were any running non GUI applications (e.g., command line applications), then they are terminated in step 275. According to one illustrative aspect, the operating system may wait up to twenty seconds and then terminate all non GUI applications irrespective of whether they responded to the request. This allows command line applications, which assent to the request, to save any necessary data and perform other cleanup as necessary. In one aspect with multiple running non GUI applications, a system message may be sent to a first running non GUI application. The first non-running GUI application will be shut down after receiving a response assenting to shut down in a predetermined time period (e.g., twenty seconds) or after the predetermined time period has elapsed. This sequence can be repeated for each running non GUI application until all are terminated. Alternatively, the system message can be sent to each running non GUI application in parallel and the operating system, if it has received a positive response from each running non GUI application within a predetermined time period or after the predetermined time period has elapsed, may commence termination of all applications. According to another illustrative aspect, step 225 may be eliminated such that all running non GUI applications are terminated in step 275. Next, shut down continues in step 290 until completion. The above sequence of steps allows the operating system to automatically terminate any running non GUI applications.

If at least one GUI application is still running (step 220: yes) then in step 230 the operating system 134 sends one of the running GUI applications a system message (e.g., WM_QUERYENDSESSION in a Windows XP environment). The system message indicates to the application that a system shut down operation has been requested and requests the application to shut down. If there are multiple running GUI applications, the operating system may choose the order by which the applications will be processed, that is which application will first receive the system message. Schemes for deciding which applications to process first include: 1) starting with the application on top of the Z-order, 2) which open application is most likely to block or veto shut down or 3) any other heuristic associated with the applications. APIs exist in Windows brand operating system, which may be utilized to formulate a desired heuristic. In an alternative aspect, an API can be provided which allows the applications to set the order in which they wish to shut down such that shut down is carried out accordingly.

While this description discusses aspects involving sending the system message requesting shut down to applications serially in this scheme and processing each application accordingly, it will be understood that in other aspects the system message may be sent to each running GUI application contemporaneously and the applications may be processed based on the order in which they respond to the request or each application may be processed as soon their response to the system message is received.

Next in step 235, the operating system 134 determines whether the GUI application has vetoed shut down by negatively responding to the system shut down request, blocked shut down by not responding to the request, or accepted shut down by responding positively to the shut down request. If the application positively responds to the shut down request (an "Accept" response to step 235), then in step 240, the operating system 134 terminates the application and control returns to step 220 to process any other running applications 135.

If the application does not respond to the request and is blocking shut down (a "block" response to step 235), then in step 245 the operating system 134 determines whether the application is hung or if the application is purposefully not responding to the shut down request. An application is hung when the application has failed to respond to any system messages within a predefined period of time. An illustrative time period is five seconds. In an illustrative implementation using a Windows XP based operating system, the operating system determines whether the application is hung using the IsHungAppWindow( ) API. The API monitors whether the operating system 134 has received responses to any system messages in the last five seconds. If an application is hung, then the system terminates the application in step 240 and control returns to step 220.

Some applications 135 will respond to a shut down request almost immediately while others may take several seconds, and yet others may purposefully not respond as they continue with other data processing or the like. Applications 135 may want to conclude processing before assenting to shut down. For example, enterprise software applications, OneNote (by Microsoft Corporation of Redmond, Washington) and other applications which automatically save data to a network server before exiting a network may take two to three seconds to respond to a system message requesting shut down. Five seconds or a time period consistent with the amount of time it takes most applications under typical operation to respond to the system message allows most applications to be terminated normally leaving only those applications which are hung or which have purposefully not responded to the shut down request. An application may not respond to a shut down request, that is block shut down, because additional data processing may still need to be performed or for other reasons. Applications 135 generally block when they know they will respond eventually, but are not ready to respond yet. For example, if Microsoft Word or Notepad have unsaved data and are asked to shut down, they may block shut down because they would like the user to indicate whether she would like to save the data. Word and Notepad know that they will respond "OK to shut down" eventually, but only after the user has indicated what she would like to do with the unsaved data.

If an application is not hung (a "no" response in step 245) or the application vetoes the shut down request (a "veto" response) in step 235, then the application is delaying shut down. In response to a "no" response in step 245 or a "veto" response in step 235, the operating system 134 determines whether the GUI application has any visible top level windows in step 250. An application may veto a shut down request for any reason it likes such as that it requires more time to complete processing such as when the application is performing an activity in the "real world" that cannot be interrupted. For example, when a CD-burning application is in the middle of writing to a CD, it cannot be interrupted. If interruption were allowed, the CD would be rendered useless. Consequently, a CD-burning application would typically veto shut down in this case. An application being used to drive a mechanical precision tool in the middle of a complex, non-interruptible operation might also veto shut down for the same reason.

If the application has no visible top level windows, then the operating system 134 may determine if the application has registered delay information, such as, for example, a delay reason string, to block the operating system shut down in step 255. In certain aspects, operating system APIs may be provided to allow applications to proactively indicate that shut down should be delayed because the application is performing a task that ought not to be interrupted by a system shut down request. The application may provide a delay reason string to provide more information about a task currently being performed by the application or a current application state. In one possible operating system API, an application may register a string value to be presented to the user after a shut down request is initiated, allowing the user to decide whether to continue the system shut down. For example, a CD-burning application may register a delay reason string stating, "A CD burn is in progress," or a media center application may register a reason string stating, "A TV show is being recorded." Both GUI applications with top level windows and GUI applications without top level windows may register reason strings to explain why they are delaying operating system shut down. While the delay information is often referred to as "reason strings" or "delay reason strings," aspects of the present disclosure also support displaying non-strings. For example, a task status bar, progress chart, or other graphic and/or image may be displayed instead of a text string.

Figure 3:
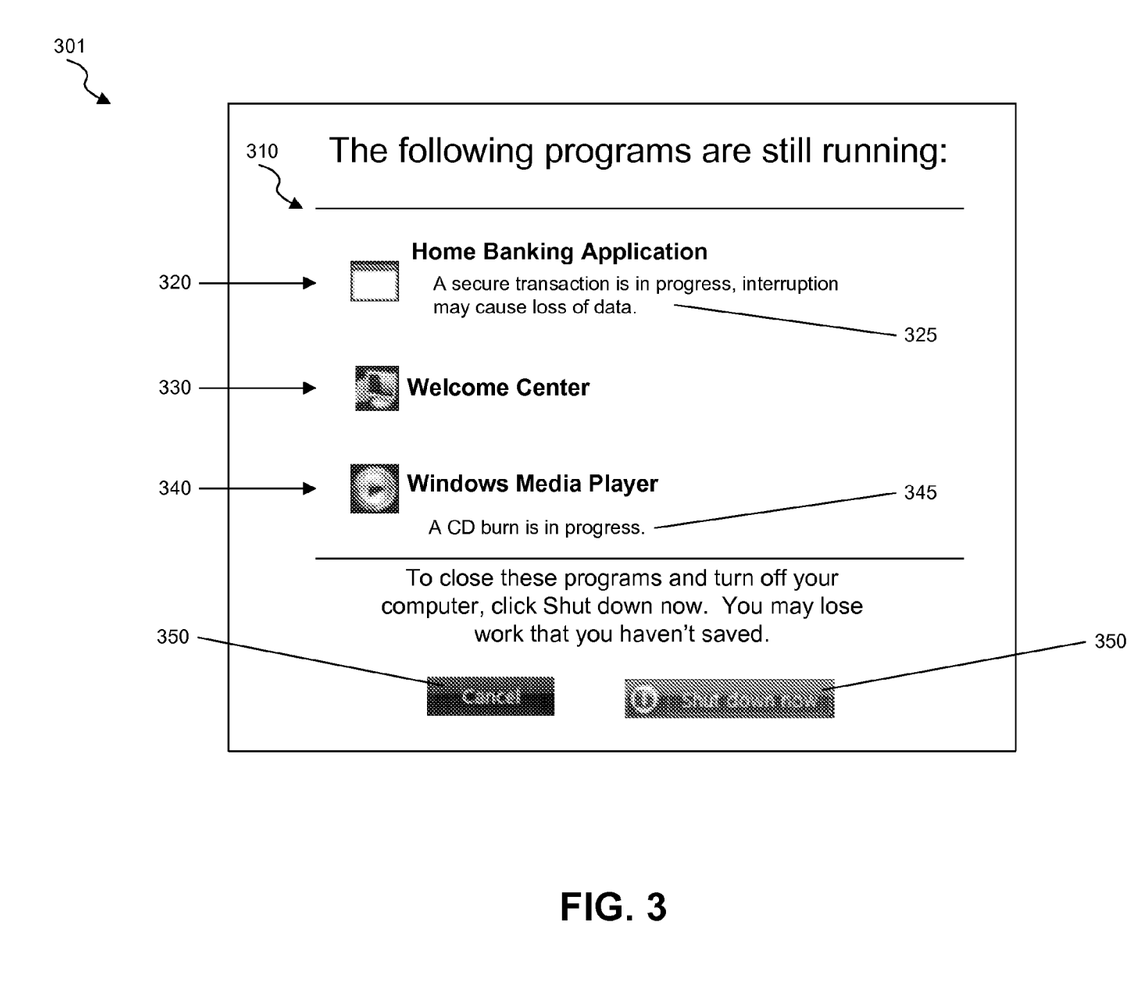
FIG. 3 is an illustrative UI for a blocked application according to aspects of the present invention.

In step 250, if the application has a top level window, then a blocking (and vetoed) application user interface (UI) is displayed in step 260. An illustrative blocking (and vetoed) application UI is shown in FIG. 3, and will be described in more detail below. Thus, applications with top level windows may be identified in the blocking application UI displayed in step 260 even if they have not registered a delay reason. In contrast, GUI applications without top level windows might be displayed in step 260 only if they have registered a reason string. That is, in step 255, if a GUI application does not have a top level window and has not registered a delay reason (reason string set response is "no"), then the operating system 134 may terminate the application in step 240 and control returns to step 220. Through this operation, GUI applications that do not have top level windows or registered delay reasons can be terminated automatically. According to a further illustrative aspect, all running applications may be queried for shutdown readiness contemporaneously, and the blocking application UI might only show the applications that have actually blocked shutdown and/or have registered delay reasons.

If the operating system 134 determines in step 250 that an application has a visible top level window, or determines in step 255 that the application has submitted a delay reason string, then the blocking (and vetoed) application user interface (UI) is displayed in step 260 for that application. According to one aspect, the blocked (and vetoed) application UI takes up a full display screen. With a full screen UI, the display is less cluttered than with existing blocking application UIs in the Windows XP brand operating system and the Mac OS X brand operating system. In Windows XP, in response to a shut down command a blocking application UI including a dialog box is displayed, which overlays the blocking application window and the remainder of the windows in the Z-order on the user's desktop. By removing this clutter, the user experience may be enhanced as the user will be less confused and able to clearly focus on the blocked application. Although a full screen UI may be advantageous, a partial screen UI is considered to be appropriate as well.

An illustrative full screen UI is shown in FIG. 3. Referring to FIG. 3, in application region 310 a window title and window thumbnail or icon image of each instance of an application blocking shut down is presented on the user interface 301. In this example, three application instances 320, 330, and 340 are displayed in region 310, each instance corresponding with an application that is running and delaying shut down. Application instances 320 and 340 also display their respective delay reason strings 325 and 345, providing the user further information regarding why the application is delaying shut down. The UI 301 also provides two objects a "Shut down Now" button 350 that permits a user to terminate all running applications and force system shut down, and a "Cancel" button 360 that allows a user to cancel the shut down operation. According to another aspect, the UI might also provide a "Shut down this application" button to terminate a particular running application selected by the user.

After the UI is displayed, the system waits for the user to select the "Cancel" button or "Shut down Now" button in step 270. If the user selects the "Shut down Now" button, in step 280 the operating system terminates all remaining running applications including the subject GUI application irrespective of whether any application may block or veto shut down and without saving any data. Although not shown, the UI may include a message that indicates that selection of the "Shut down Now" command will cause all unsaved data to be lost. Thereafter, the shut down process continues until completion in step 290. In response to the "Shut down Now" command, all GUI applications can be instantly terminated and all non GUI (command line) applications can be informed shut down is underway and be terminated if they do not immediately initiate shut down. The "Shut down Now" button allows the user to automatically force shut down of all applications with a single click or selection avoiding the need to individually shut down each application. This may reduce user frustration and simplify the shut down operation for many users. If the user selects the "Cancel" button in step 270, in step 295 the operating system cancels shut down and returns the UI to the shell, e.g., the Windows desktop in a Windows based operating system.

Ultimately before the completion of steps 250, 255, 260 and 270, a blocking application may send a response to the shut down request. In this instance, system operation is interrupted and if the application assents to application shut down, control shifts to step 240 where the application is terminated or if the application vetoes the shut down request, the process continues or alternatively, control could return to step 235.

Nearly all the applications that a user may be concerned with, primarily those with unsaved data, have top-level windows. By automatically terminating non GUI applications and GUI applications that do not have top-level windows and have not registered a delay reason, the number of blocking applications that are brought to the attention of the user can be significantly reduced. As such, the time required for system shut down and the associated user aggravation and frustration may be reduced.

Figure 4:
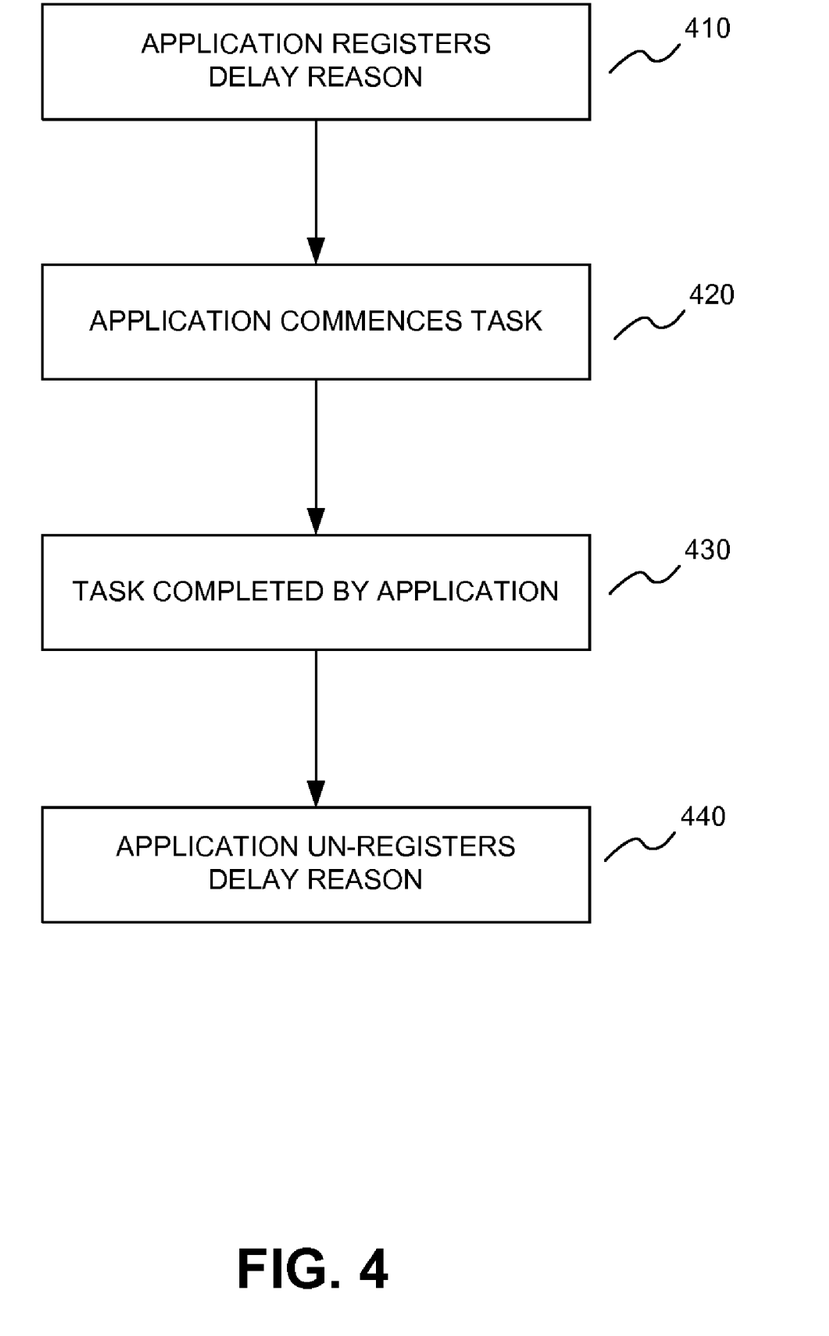
FIG. 4 is a flow chart showing an illustrative implementation according to aspects of the present invention.

FIG. 4 describes an illustrative process for an application executing a task that may delay operating system shut down. According to this example, in step 410 the application registers a delay reason, for example, by calling an operating system API and passing in a string value corresponding to a delay reason. In step 420, the application begins to perform a task that ought not to be interrupted with by a system shut down, for example, a music application burning a CD. While the application is executing this task, it will likely send a negative response when operating system shut down is initiated while the task is in progress, rather than allowing itself to be terminated automatically. If a delay reason has been registered, a shut down UI may be presented to the user with the application name and delay reason string as shown in FIG. 3, allowing the user an opportunity to terminate the application or to cancel the system shut down. Assuming the system shut down is cancelled, or the task is finished before the user decides to terminate the application, the application completes the task in step 430. In step 440, since the task is complete, the application no longer needs to delay shut down to complete the task. Accordingly, the application un-registers its delay reason, for example, by calling an operating system API to remove any delay reasons previously registered for the application.

Figure 5:
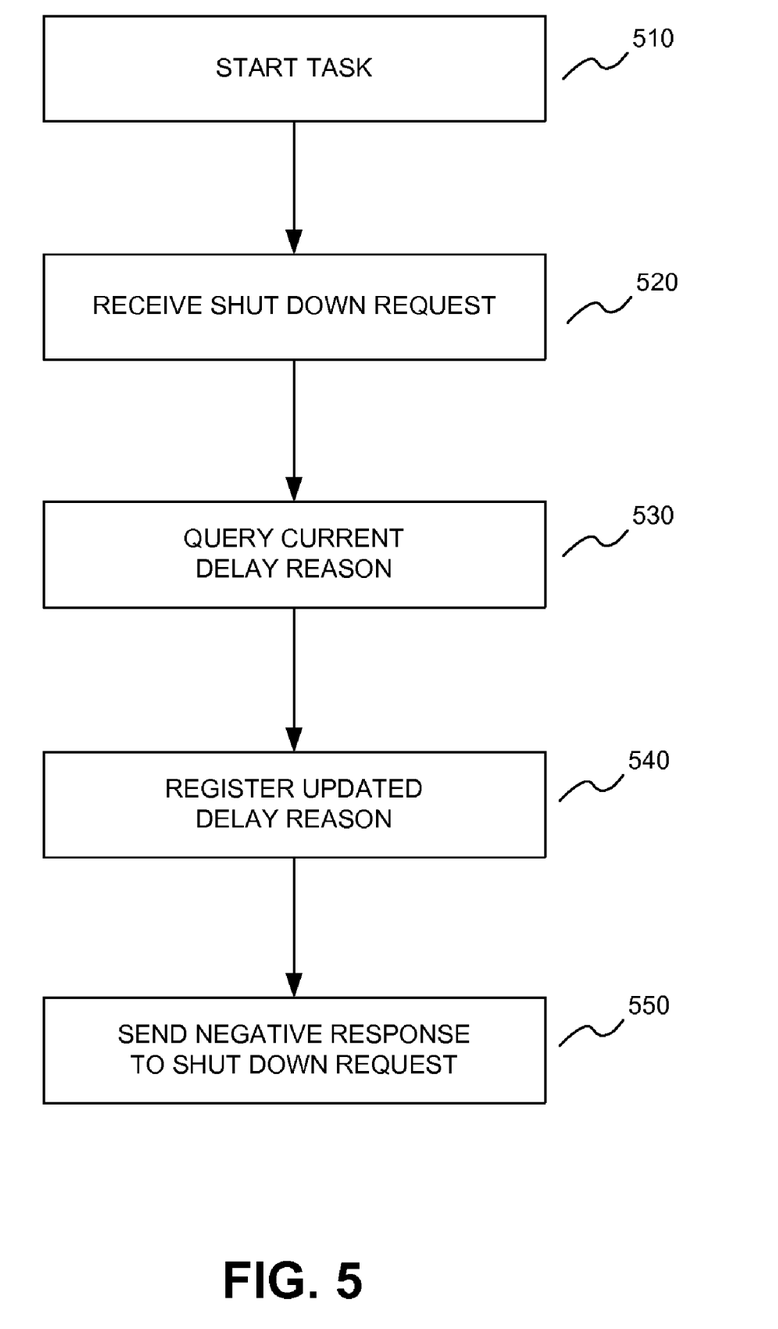
FIG. 5 is a flow chart showing an illustrative implementation according to aspects of the present invention.

FIG. 5 describes another illustrative process by which an application may execute a task that may potentially delay a system shut down. In this example, in step 510 the application begins a task that ought not to be interrupted by a system shut down, such as the tasks described above or the task started in step 420. However, in this example, the application executes the task without registering a delay reason prior to commencing the task.

In step 520, the application receives a shut down request, for example, a WM_QUERYENDSESSION message in a Windows XP or Windows Vista environment. The shut down request indicates to the application that a system shut down operation has been requested and requests the application to shut down. Certain applications may have a shut down request handler, for example, a WM_QUERYENDSESSION message handler, designed to execute code in response to a shut down request and/or to respond to the request. In this example, in the optional step 530, the shut down request handler of the application issues a delay reason query to retrieve a previously submitted delay reason string, if one is currently registered for this application. The delay reason query may be implemented, for example, with an operating system API that returns a string value corresponding to the currently registered delay reason string for the application. By examining the results of the delay reason query, the application may determine that it has no currently registered delay reason, or alternatively that it has an outdated delay reason that no longer accurately describes the currently executing task. Thus, in step 540, the shut down request handler may update this information, for example, by registering a new delay reason by building and passing in a reason string value to the operating system API. Thus, the application may change, by registering or un-registering delay reason strings, the information that will be displayed to the user regarding the system shut down delay by the application. For example, when burning a CD, the CD-burning application might provide not only a simple reason message (e.g., "A CD burn is in progress."), but may also include additional information such as the completed percentage or estimated time remaining in the CD burn (e.g., "30 seconds until task is complete."). Thus, although this UI component and related APIs often refer to a "delay reason," aspects of the present disclosure permit the delay reason to be user-configurable. For example, an application may choose not to register a reason in the delay reason, but may instead place task status, user information, or other application-related information to be displayed as text and/or graphical images displayed to the user in a delay reason field.

After setting a current delay reason string, the application may now send a negative response to the shut down request in step 550. This may allow an application to indicate that it should delay system shut down and subsequently appear in the delay shut down UI with the registered delay reason to provide the user an accurate current description of the task being performed by the application.

According to certain aspects, one of the benefits that may be realized includes the reduction of the types of applications that may block or veto shut down. Also, certain aspects may improve the user experience associated with applications blocking shut down and may remove some of the more confusing aspects associated with the shut down user experience.

While illustrative systems and methods as described herein embodying various aspects of the present invention are shown, it will be understood by those skilled in the art, that the invention is not so limited. Modifications may be made by those skilled in the art, particularly in light of the foregoing teachings. For example, it will be appreciated that the operating system 134 may also cause the delay reason string to be output via speakers 197 in the form of speech, where a number of reasons are either stored in and retrieved from RAM 132 corresponding to the various reasons shut down may be blocked, or the processing unit 120 may generate speech from the delay reason string. In addition, each of the elements of the aforementioned aspects may be utilized alone or in combination or subcombination with elements of the other aspects. It will also be appreciated and understood that modifications may be made without departing from the true spirit and scope of the present invention. The description is thus to be regarded as illustrative instead of restrictive on the present invention.

We claim:

1. One or more computer readable storage media storing computer-executable instructions which, when executed on a computer system, perform a method comprising:
   receiving information from an application regarding a task that the application is configured to perform;
   receiving a command to initiate operating system shut down while the application is running;
   determining that the operating system shut down should be delayed due to a status of the application; and
   displaying the information received from the application on a graphical user interface during a period in which the operating system shut down is being delayed, the graphical user interface showing that the application is running.

2. The computer readable storage media according to claim 1, further comprising receiving a user command while delaying the operating system shut down, and terminating the application responsive to the user command.

3. The computer readable storage media according to claim 1, wherein the step of determining that the operating system shut down should be delayed comprises: sending a shut down request to the application; and receiving a negative response to the shut down request from the application.

4. The computer readable storage media according to claim 1, wherein the step of determining that the operating system shut down should be delayed comprises: sending a shut down request to the application; and receiving no response to the shut down request from the application.

5. The computer readable storage media according to claim 1, wherein the application is a graphical user interface application with no top level window, and the step of determining that the operating system shut down should be delayed depends both on receiving the information from the application and on receiving a negative response to a shut down request from the application.

6. The computer readable storage media according to claim 1, wherein receiving the information from the application occurs prior to receiving the command to initiate operating system shut down.

7. The computer readable storage media according to claim 1, wherein receiving the information from the application occurs after receiving the command to initiate operating system shut down.

8. The computer readable storage media according to claim 1, wherein receiving information from the application comprises: receiving a query relating to delaying operating system shut down due to the status of the application; and in response to the query, sending delay information previously received from the application, the delay information related to a task that the application is configured to perform.

9. The computer readable storage media according to claim 8, wherein receiving information from the application further comprises receiving updated information relating to the task, and displaying the information received comprises displaying the updated information.

10. One or more computer readable storage media storing computer-executable instructions for providing a user interface allowing a user to view applications delaying operating system shut down, the user interface comprising:
   at least one application region, each the at least one application region corresponding to an application delaying operating system shut down, wherein each the at least one application region comprises an application identification region configured to display identifying information associated with the application and a delay information region configured to display information relating to a task associated with the application, wherein the at least one application region corresponds to a graphical user interface showing that the application delaying operating system shut down is running;
   a shut down object, which responsive to selection causes the operating system to terminate applications identified in the application region; and
   a cancel object, which responsive to selection causes the operating system to cancel shut down.

11. The computer readable storage media according to claim 10, wherein the application delaying operating system shut down is a graphical user interface application with a top level window.

12. The computer readable storage media according to claim 11, wherein the delay information region for the at least one application region does not display any information if the at least one application region corresponds to the graphical user interface application with a top level window.

13. The computer readable storage media according to claim 10, wherein the application delaying operating system shut down is a graphical user interface application with no top level window.

14. The computer readable storage media according to claim 10, the graphical user interface further includes a running application drop down menu object, which responsive to selection causes a list of other running applications to be displayed.

15. The computer readable storage media according to claim 10, wherein the application identification region of the at least one application region includes a title, and one of a thumbnail image and an icon, associated with the application corresponding to the at least one application region.

16. One or more computer readable storage media storing computer-executable instructions for performing a method for executing an application task on a computer system with an operating system, the method comprising the steps of:
   before receiving a command to shut down the computer system, receiving a command to execute a task associated with an application running on a computer system with an operating system;
   sending a first signal to the operating system configuring the operating system to delay shut down based on the application, the first signal comprising information relating to the task;

displaying on a graphical user interface information showing that the application is running;

executing the task by the application; and after the task is complete, sending a second signal to the operating system configuring the operating system not to delay shut down based on the application.

17. The computer readable storage media according to claim 16, wherein the application is a graphical user interface application with a top level window.

18. The computer readable storage media according to claim 16, wherein the application is a graphical user interface application with no top level window.

19. The computer readable storage media according to claim 16, the method further comprising the steps of: while executing the task, receiving a shut down request from the operating system; and sending a negative response to the shut down request.

20. The computer readable storage media according to claim 19, wherein the first signal comprising the information relating to the task is sent after receiving the shut down request from the operating system.

* * * * *